(12) United States Patent
Iwaki et al.

(10) Patent No.: US 8,174,529 B2
(45) Date of Patent: May 8, 2012

(54) GRAPHICS PROCESSING UNIT AND INFORMATION PROCESSING APPARATUS

(75) Inventors: Tsutomu Iwaki, Hanno (JP); Koji Hachiya, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/087,246

(22) Filed: Apr. 14, 2011

(65) Prior Publication Data

US 2012/0001930 A1    Jan. 5, 2012

(30) Foreign Application Priority Data

Jun. 30, 2010    (JP) ................................. 2010-150457

(51) Int. Cl.
*G06F 15/00* (2006.01)
*G06F 13/14* (2006.01)
*G06T 1/00* (2006.01)

(52) U.S. Cl. ...................................... 345/501; 345/519

(58) Field of Classification Search ................... 345/501
See application file for complete search history.

(56) References Cited

U.S. PATENT DOCUMENTS

| 2006/0059510 | A1* | 3/2006 | Huang et al. .................... 725/32 |
| 2006/0228029 | A1* | 10/2006 | Zhang et al. .................. 382/232 |
| 2007/0286275 | A1 | 12/2007 | Kimura et al. |

FOREIGN PATENT DOCUMENTS

| JP | 2002-74384 | 3/2002 |
| JP | 2002-230580 | 8/2002 |
| JP | 2005-096168 | 10/2005 |
| WO | WO 2005/096168 | 10/2005 |

* cited by examiner

*Primary Examiner* — Jacinta M Crawford
(74) *Attorney, Agent, or Firm* — Blakely, Sokoloff, Taylor & Zafman LLP

(57) ABSTRACT

According to one embodiment, a graphics processing unit detects characteristics of video data by analyzing frames of the video data by using at least one first processing core of a plurality of processing cores, and applies a process, which is associated with the detected characteristics of the video data, to audio data on a memory, by using at least one second processing core of the plurality of processing cores. The graphics processing unit includes an audio signal output interface and outputs an audio signal corresponding to the audio data, to which the process has been applied, to a sound device.

8 Claims, 8 Drawing Sheets

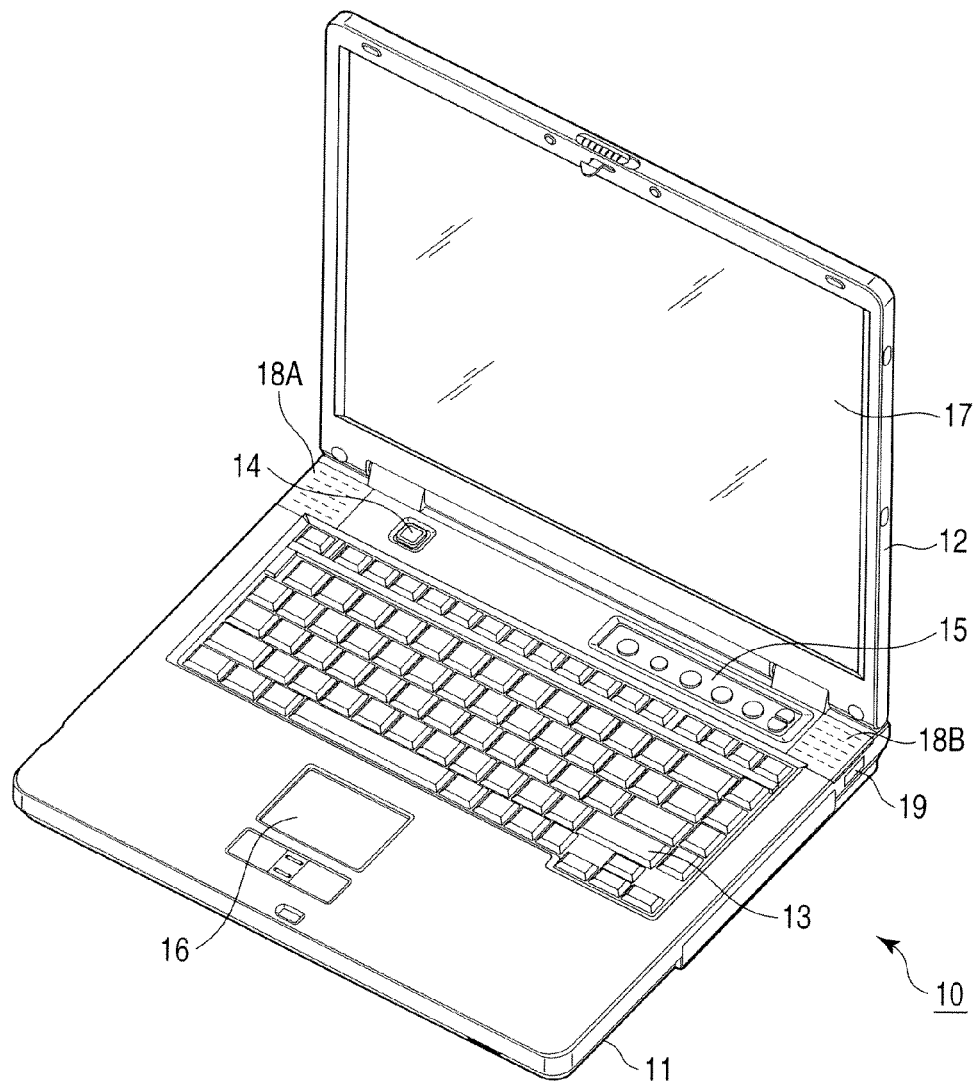
F I G. 1

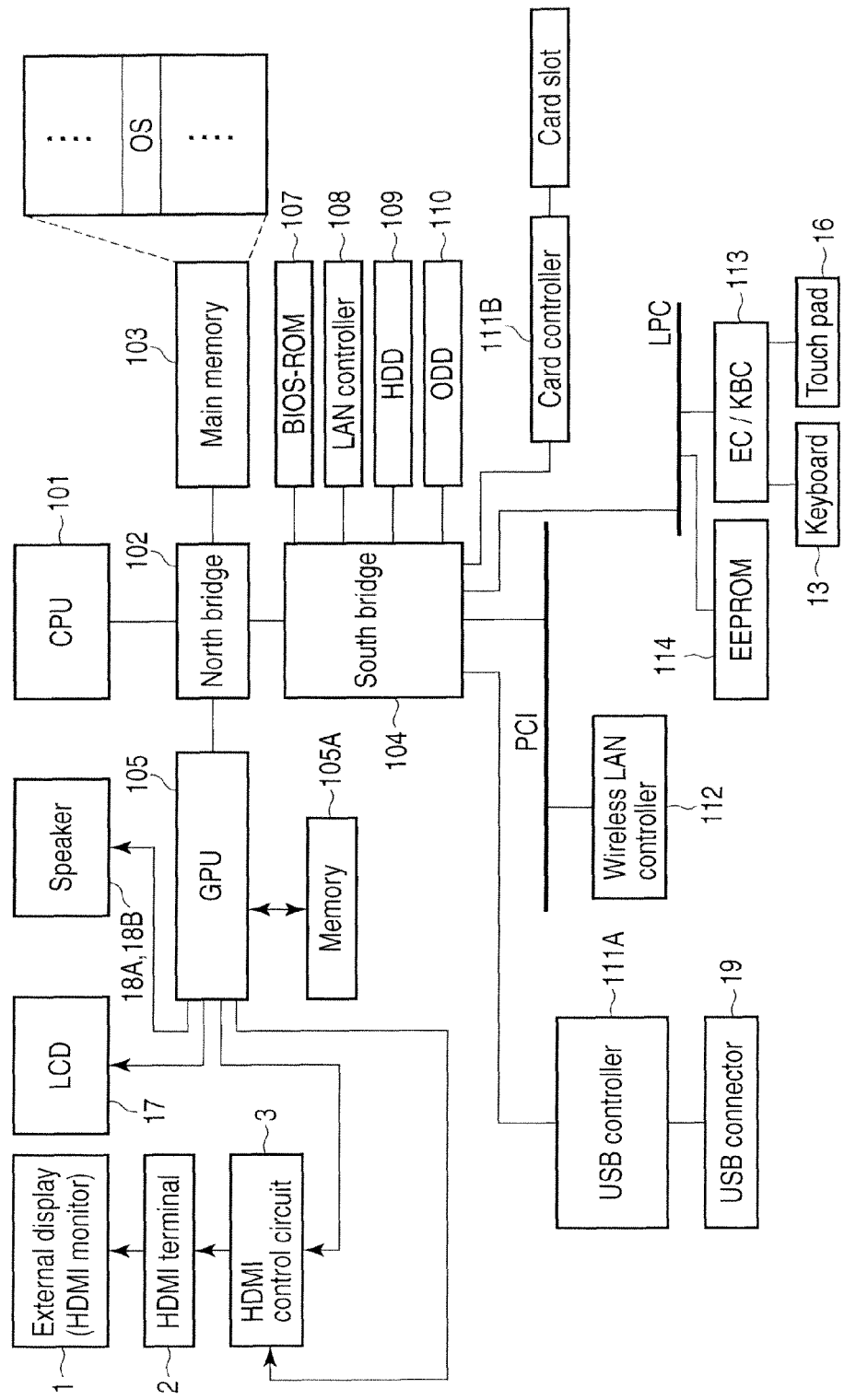
F I G. 2

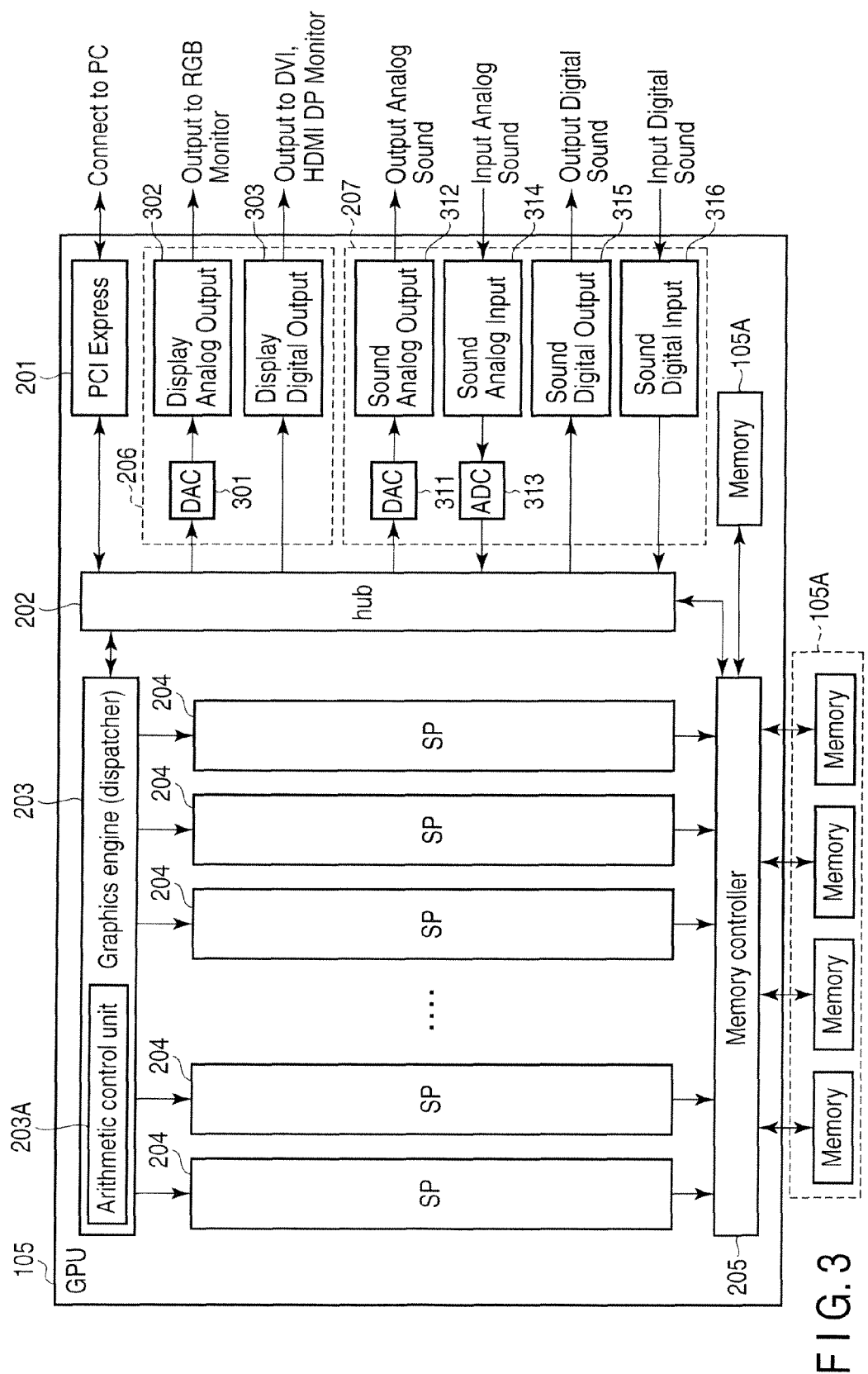
F I G. 3

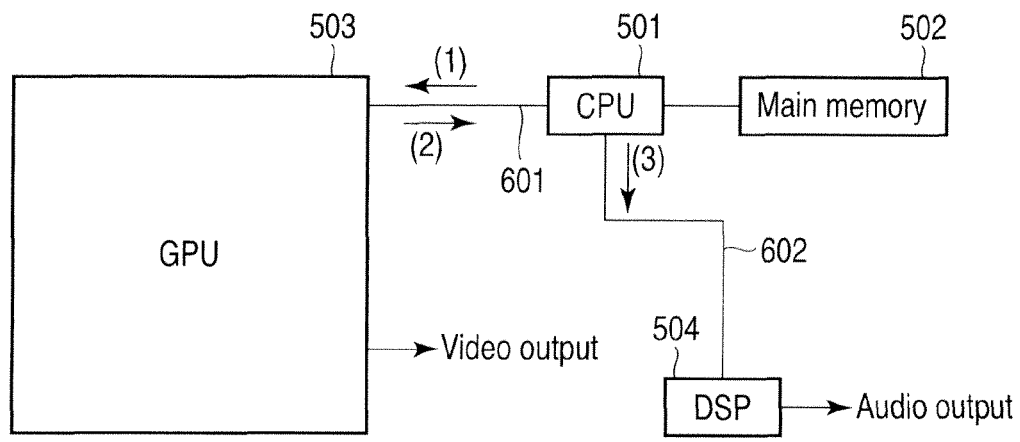
F I G. 8
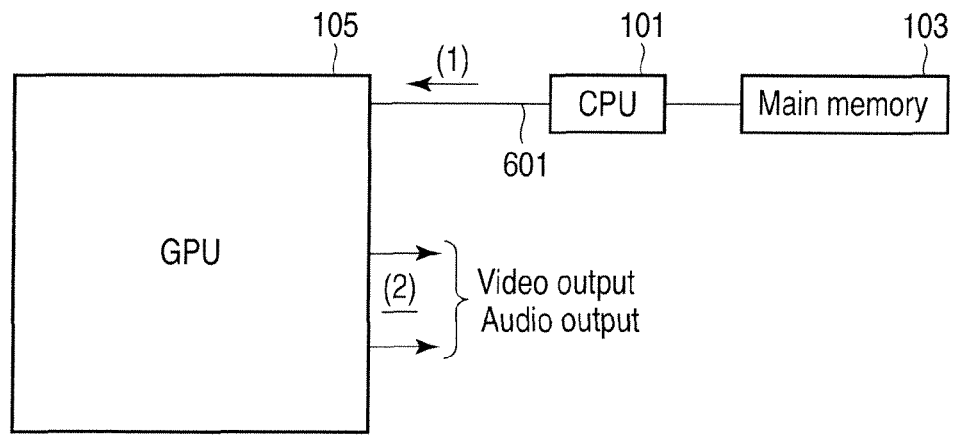
F I G. 9

GRAPHICS PROCESSING UNIT AND INFORMATION PROCESSING APPARATUS

CROSS-REFERENCE TO RELATED APPLICATIONS

This application is based upon and claims the benefit of priority from Japanese Patent Application No. 2010-150457, filed Jun. 30, 2010; the entire contents of which are incorporated herein by reference.

FIELD

Embodiments described herein relate generally to a graphics processing unit and an information processing apparatus using the graphics processing unit.

BACKGROUND

In general, in an information processing apparatus such as a personal computer, a graphics processing unit (GPU) is used in order to enhance the image-rendering capability of the information processing apparatus. Most of modern GPUs include multiple processing cores which are operable in parallel, and can execute, for example, 2D or 3D graphics arithmetic operations at high speed.

On the other hand, the processing of audio data (also referred to as "sound data") in the information processing apparatus is usually executed by a digital signal processor (DSP) which is called "sound controller". However, in general, the arithmetic processing capability of the DSP is relatively low. It is difficult, therefore, for the DSP alone to execute a high-level process on the audio data.

In addition, recently, a media processing LSI has been developed, which is designed to handle both video data and audio data.

However, what is realized by an ordinary media processing LSI is, at most, a function of encoding or decoding video data and a function of encoding or decoding audio data. Besides, in the ordinary media processing LSI, a process on video data and a process on audio data are independent from each other.

In digital content (e.g. movie, DVD video, broadcast program, etc.) including video data and audio data, the video data and audio data are correlated. Therefore, in an apparatus which plays back digital content, a novel function needs to be realized for making the process on video data and the process on audio data cooperate with each other.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view illustrating the structure of an information processing apparatus according to an embodiment;

FIG. 2 is an exemplary block diagram illustrating the system configuration of the information processing apparatus of the embodiment;

FIG. 3 is an exemplary block diagram illustrating the structure of a graphics processing unit which is provided in the information processing apparatus of the embodiment;

FIG. 8 is an exemplary diagram for describing the flow of video data and audio data in a system using a conventional graphics processing unit;

FIG. 9 is an exemplary diagram for describing the flow of video data and audio data in a system using the graphics processing unit shown in FIG. 3.

DETAILED DESCRIPTION

Figure 4:
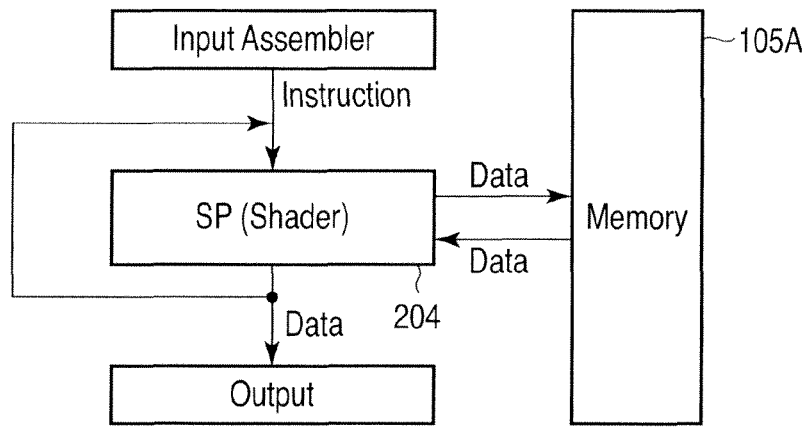
FIG. 4 is an exemplary diagram for describing the flow of a process which is executed by the graphics processing unit shown in FIG. 3.

Various embodiments will be described hereinafter with reference to the accompanying drawings.

In general, according to one embodiment, a graphics processing unit comprises a host interface, a memory controller, a plurality of processing cores, an arithmetic control unit, a video signal output interface, and an audio signal output interface. The host interface is configured to receive video data and audio data from a host. The memory controller is configured to store the received video data and audio data in a memory. The plurality of processing cores are coupled to the memory. The arithmetic control unit is configured to detect characteristics of the video data by analyzing frames of the video data on the memory by using at least one first processing core of the plurality of processing cores, and to apply a process, which is associated with the detected characteristics of the video data, to the audio data on the memory, by using at least one second processing core of the plurality of processing cores. The video signal output interface is configured to generate a video signal corresponding to the video data and to output the generated video signal to a display device. The audio signal output interface is configured to generate an audio signal corresponding to the audio data to which the process has been applied, and to output the generated audio signal to a sound device.

FIG. 1 is a perspective view showing the external appearance of an information processing apparatus according to an embodiment. The information processing apparatus is realized, for example, as a notebook-type personal computer 10. As shown in FIG. 1, the computer 10 comprises a computer main body 11 and a display unit 12. An LCD (liquid crystal display) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the USB (universal serial bus)

2.0 standard. In addition, an external display connection terminal (not shown), which supports, e.g. the HDMI (high-definition multimedia interface) standard, is provided on the rear surface of the computer main body 11. The external display connection terminal is used to output a digital video signal to an external display.

FIG. 2 is a view showing the system configuration of the computer 10.

The computer 10, as shown in FIG. 2, comprises a CPU 101, a north bridge 102, a main memory 103, a south bridge 104, a graphics processing unit (GPU) 105, a memory 105A, a BIOS-ROM 107, a LAN controller 108, a hard disk drive (HDD) 109, an optical disc drive (ODD) 110, a USE controller 111A, a card controller 111B, a wireless LAN controller 112, an embedded controller/keyboard controller (EC/KBC) 113, and an EEPROM 114.

The CPU 101 is a processor for controlling the operations of the respective components in the computer 10. The CPU 101 executes an operating system (OS) 201 and various application programs, which are loaded from the HDD 109 into the main memory 103. The application programs include a video player for playing back various digital contents (e.g. movie, DVD video, broadcast program data, etc.). The video player is configured to play back video data and audio data which are included in digital contents by using the GPU 105. The CPU 101 also executes a BIOS which is stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of communicating with the GPU 105 via, e.g. a PCI EXPRESS serial bus.

The GPU 105 controls the LCD 17 that is used as a display monitor of the computer 10, and an external display. A video signal, which is generated by the GPU 105, is sent to the LCD 17. In addition, the GPU 105 can send a digital video signal to an external display 1 via an HDMI control circuit 3 and an HDMI terminal 2. The HDMI terminal 2 is the above-described external display connection terminal. The HDMI terminal 2 is capable of sending a non-compressed digital video signal and a digital audio signal to the external display 1, such as a TV, via a single cable. The HDMI control circuit 3 is an interface for sending a digital video signal to the external display 1, which is called "HDMI monitor", via the HDMI terminal 2.

The GPU 105 is coupled to the CPU 101 via, e.g. a PCI Express serial bus. The GPU 105 is configured to process graphics data, video data and audio data in accordance with a request from the CPU 101. To be more specific, the GPU 105 includes an audio signal output interface (audio signal output interface unit) for outputting an audio signal (also referred to as "sound signal") to a speaker or some other external sound device, and a function of analyzing and processing audio data. Accordingly, in the computer 10, not only graphics data, but also both video data and audio data can be processed by the GPU 105. A video signal and an audio signal (also referred to as "sound signal"), which are generated by the GPU 105, are directly output from the GPU 105 to a display device (e.g. LCD 17, external display) and a sound device (speaker 18A, 18B, external sound device).

In this manner, in the present embodiment, the GPU 105 can simultaneously process both video data and audio data, and can directly output to the outside a video signal corresponding to video data and an audio signal corresponding to audio data.

The GPU 105 incorporates a plurality of processing cores (streaming processors). The GPU 105 receives audio data from the CPU 101 via, e.g. a PCI EXPRESS bus, and processes the received audio data by using at least one of the processing cores. The process of the audio data by the processing core may be realized by controlling an instruction set corresponding to the processing core by firmware or software. Thereby, the process of audio data, which is executed by the GPU 105, can be made programmable, and various processes (edit) on audio data can be executed by the GPU 105. The edit of audio data means applying a process to audio data. The edit of audio data includes, for instance, various sound effects, various filters, 2D to 3D sound conversion, and volume control. For example, the GPU 105 can analyze audio data according to a program loaded on the processing cores, and can adaptively process (edit) the audio data according to the analysis result.

Similarly, the GPU 105 can also receive video data from the CPU 101 via, e.g. a PCI EXPRESS bus, and can process the received video data by using at least one of the processing cores. The process of the video data by the processing core may also be realized by controlling an instruction set corresponding to the processing core by firmware or software. Thereby, the process of video data, which is executed by the GPU 105, can be made programmable, and various processes (edit) on video data can be executed by the GPU 105. The edit of video data means applying a process to video data. The edit of video data includes, for instance, high-resolution conversion, 2D to 3D video conversion, resize, and rotation. The GPU 105 can analyze each of frames of video data according to a program loaded on the processing cores, and can adaptively process (edit) the video data according to the analysis result.

Furthermore, the GPU 105 can adaptively process audio data in accordance with the content of video data. In this case, the GPU 105 detects characteristics of video data by analyzing frames of the video data, and applies a process, which is associated with the detected characteristics of video data, to the audio data. For example, the GPU 105 detects, based on the characteristics of video data, a specific scene in the video data (e.g. a conversation scene, a dark-image scene, a light-image scene, a fast-moving scene, a slow-moving scene, etc.), and applies a predetermined process, which is associated with the specific scene, to each of frames in the audio data belong to the detected specific scene. In the analysis of each video frame, for example, the GPU 105 may generate a histogram of each frame of the video data, and may detect the characteristics of each video frame, based on the histogram.

Conversely, the CPU 105 can detect the characteristics of audio data by analyzing frames of the audio data by using at least one processing core, and can apply a process, which is associated with the detected characteristics of the audio data, to video data by using at least one other processing core.

The processing result of video data and the processing result of audio data may be directly output to the outside as a video signal and an audio signal. Alternatively, the processing result of video data and the processing result of audio data may be transferred from the GPU 105 to the CPU 101. Besides, in order to recursively execute the process of video data and the process of audio data, the processing result of video data and the processing result of audio data may be fed back to the associated processing cores in the GPU 105.

Moreover, the GPU 105 may add a time stamp (time code) to each video frame in video data and each audio frame in audio data. By the time stamp, processed video data and processed audio data can be synchronized, and a video signal corresponding to the processed video data and an audio signal corresponding to the processed audio data can be output to the outside in the state in which the video signal and audio signal are synchronized.

The south bridge 104 controls devices on a PCI (Peripheral Component Interconnect) bus and devices on an LPC (Low Pin Count) bus. The south bridge 104 includes an IDE (Integrated Drive Electronics) controller for controlling the HDD 109 and ODD 110.

The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 111A communicates with an external device which supports, e.g. the USB 2.0 standard (the external device is connected via the USB connector 19). The card controller 111B executes data write and data read in/from a memory card such as an SD card, which is inserted in a card slot provided in the computer main body 11.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Next, referring to FIG. 3, the structure of the GPU 105 is described.

The GPU 105 comprises a PCI Express interface 201, a hub 202, a graphics engine 203, a plurality of streaming processors (SP) 204, a memory controller 205, memory 105A, a video signal output interface 206, and an audio signal input/output interface 207.

The PCI Express interface 201 is a host interface (host interface unit) for communicating with a host (CPU 101, main memory 103). The PCI Express interface 201 receives graphics data, video data and audio data from the host (CPU 101, main memory 103). In addition, the PCI Express interface 201 receives, from the host, requests (instructions) for processing graphics data, video data and audio data. The graphics data, video data and audio data, which have been received from the CPU 101 by the PCI Express interface 201, are stored in the memory 105A by the memory controller 205 (buffering). The memory 105A is a memory called "frame buffer" or "video memory". The memory 105A is used as a local memory of the GPU 105. The memory 105A is realized by, for example, either an external memory which is connected to the GPU 105 via a memory bus, or an internal memory which is built in the GPU 105, or both of the external memory and the internal memory. The internal memory may be a cache memory.

The graphics engine 203 executes processes on the graphics data, video data and audio data by using the streaming processors (SP) 204. Each streaming processor (SP) 204 functions as a processing core (also referred to as "programmable shader") which can execute a graphics arithmetic operation and a general-purpose arithmetic operation. The content of the arithmetic operation, which is executed by each streaming processor (SP) 204, can be determined by instructions which are loaded from the graphics engine 203 in each streaming processor (SP) 204. Each streaming processor (SP) 204 can refer to the graphics data, video data and audio data on the memory 105A via the memory controller 205. Further, each streaming processor (SP) 204 can write a processing result of the graphics data, video data or audio data in the memory 105A via the memory controller 205.

Processes to be executed are allocated to the respective streaming processors (SP) 204 by the graphics engine 203. In this sense, the graphics engine 203 is a dispatcher (also referred to as "scheduler") which allocates the plural processes (tasks) to the plural streaming processors (SP) 204, thereby to execute the plural processes in parallel.

In the present embodiment, the graphics engine 203 includes an arithmetic control unit 203A, in order to make it possible to adaptively process each frame of audio data in accordance with an analysis result of each frame of video data.

The arithmetic control unit 203A allocates to at least one first streaming processor (SP) 204 of the plural streaming processors (SP) 204 a first task for detecting the characteristics of video data by analyzing the frames of the video data on the memory 105A. This task may be realized as a thread. Further, the arithmetic control unit 203A allocates to at least one second streaming processor (SP) 204 of the plural streaming processors (SP) 204 a second task for applying a process, which is associated with the detected characteristics of video data, to the audio data on the memory 105A. The first task and the second task are executed in parallel by different streaming processors (SP) 204.

Each first streaming processor (SP) 204, to which the first task is allocated, executes instructions which are loaded from the arithmetic control unit 203A into the first streaming processor (SP) 204. Each first streaming processor (SP) 204 fetches a frame of video data from the memory 105A, and analyzes the image of the frame. In the analyzing process, it is possible to execute, for example, a process of detecting image characteristics of each video frame, a process of detecting a specific object (e.g. a person) appearing in the video frame, a process of detecting a movement of the specific object, and a process of detecting the position of the specific object in the video frame. The analysis processing result indicative of the characteristics of each video frame is stored in the memory 105A.

Each second streaming processor (SP) 204, to which the second task is allocated, executes instructions which are loaded from the arithmetic control unit 203A into the second streaming processor (SP) 204. Each second streaming processor (SP) 204 applies to each audio frame a process (edit) which is associated with the characteristics of the corresponding video frame, for example, based on the analysis processing result indicative of the characteristics of each video frame, which is stored in the memory 105A. In this case, each second streaming processor 204 fetches a frame of audio data from the memory 105A, and applies a process (edit), which is associated with the characteristics of the corresponding video frame, to the fetched frame of audio data.

In the present embodiment, as described above, it is possible to execute in parallel the process of analyzing the video data on the memory 105A and the process of applying a process (edit) to the audio data on the memory 105A in accordance with the analysis result of the video data, by using a plurality of streaming processors (SP) 204.

The video signal output interface (video signal output interface unit) 206 generates a video signal corresponding to the video data which is processed by the streaming processor (SP) 204, and outputs the generated video signal to the display device. The video signal output interface 206 includes a digital-to-analog converter (DAC) 301, a display analog output interface (display analog output interface unit) 302, and a display digital output interface (display digital output interface unit) 303. The digital-to-analog converter (DAC) 301 and display analog output interface 302 generate an analog video signal (RGB signal) from the processed video data. The analog video signal (RGB signal) is output to an external RGB monitor via an analog video signal output pins which are provided in the GPU 105. The display digital output interface 303 generates a digital video signal from the processed video data. The digital video signal is output to an external digital monitor (DVI monitor, HDMI monitor, DP monitor, etc.) via a digital video signal output pins which are provided in the GPU 105.

The audio signal input/output interface (audio signal input/output interface unit) 207 receives an audio signal from an external device and outputs an audio signal to the external device. The audio signal input/output interface 207 includes a digital-to-analog converter (DAC) 311, a sound analog output interface (sound analog output interface unit) 312, an analog-to-digital (ADC) 313, a sound analog input interface (sound analog input interface unit) 314, a sound digital output interface (sound digital output interface unit) 315, and a sound digital input interface (sound digital input interface unit) 316.

The digital-to-analog converter (DAC) 311 and sound analog output interface 312 generate an analog audio signal (also referred to as "analog sound signal") from processed audio data. The analog audio signal is output to the speakers or some other external analog sound device via an analog audio signal output pins which are provided in the GPU 105. The sound analog input interface 314 inputs an analog audio signal from a microphone or the like, and the analog-to-digital converter (ADC) 313 converts the input analog audio signal to a digital audio signal.

The sound digital output interface 315 generates a digital audio signal (also referred to as "digital sound signal") from processed audio data. The digital audio signal is output to an external digital sound device via a digital audio signal output pins which are provided in the GPU 105. The sound digital input interface 316 inputs a digital audio signal from the outside.

The input audio signal can also be processed by the streaming processors (SP) 204. For example, the arithmetic control unit 203A can also execute a speech recognition process of recognizing a speech signal (an audio signal), which is input from a microphone, by using at least one streaming processor (SP) 204. The result of speech recognition can be sent to the host via the PCI Express interface 201.

In the embodiment, as described above, the GPU 105 is additionally provided with external interfaces which are necessary for inputting/outputting audio signals. Moreover, the high-level audio process, in which an audio process that is conventionally implemented in DSPs is expanded, is executed by using the memory 105A and streaming processors 204 of the GPU 105. Thereby, a DSP for processing audio can be excluded from the system of the computer 10, and the total cost of the system can be reduced.

FIG. 4 illustrates an arithmetic process which is executed by the streaming processor (SP) 204. At least one instruction from the arithmetic control unit 203A is input to the streaming processor 204 (Input Assembler). The streaming processor (SP) 204 fetches data from the memory 105A and executes various arithmetic operations on the fetched data, in accordance with the instruction. The content of the arithmetic operation that is executed is determined by the instruction. The streaming processor (SP) 204 successively executes the fetch and arithmetic operation of data, while writing the arithmetic result in the memory 105A or feeding back the arithmetic result to the streaming processor (SP) 204 itself, according to the necessity.

Figure 5:
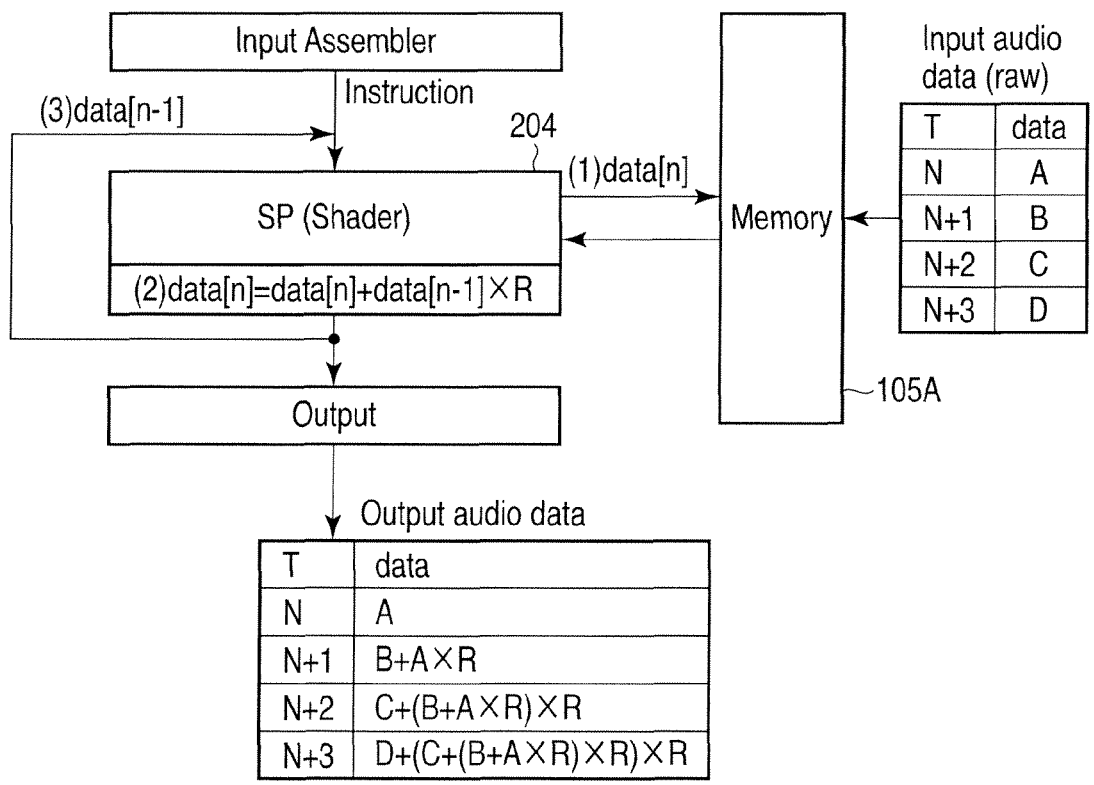
FIG. 5 is an exemplary diagram for describing the flow of a reverberation process which is executed by the graphics processing unit shown in FIG. 3.

FIG. 5 illustrates an example of an arithmetic process for a reverberation process which is executed by the streaming processor (SP) 204. The following instruction is preloaded in the streaming processor (SP) 204:

$$data[n]=data[n]+data[n-1]\times R$$

where R is a coefficient representing the intensity of reverberation in the reverberation process.

Audio data comprises a series of data (A, B, C, D, . . . ) which are arranged in a time-series manner. The audio data is buffered in the memory 105A in advance. The streaming processor (SP) 204 acquires the audio data as discrete data from the memory 105A, and executes an instruction which is given in advance. Thereby, audio data, in which a reverberation effect is applied to each discrete data, is generated at last by the streaming processor (SP) 204. In a part "Output" in FIG. 5, the GPU 105 outputs to the outside an audio signal corresponding to the audio data which has been subjected to the reverberation process, that is, the audio data to which the reverberation effect has been applied.

In the above-described manner, a substitute process for the DSP can be executed by the streaming processor (SP) 204 in the GPU 10.

Figure 6:
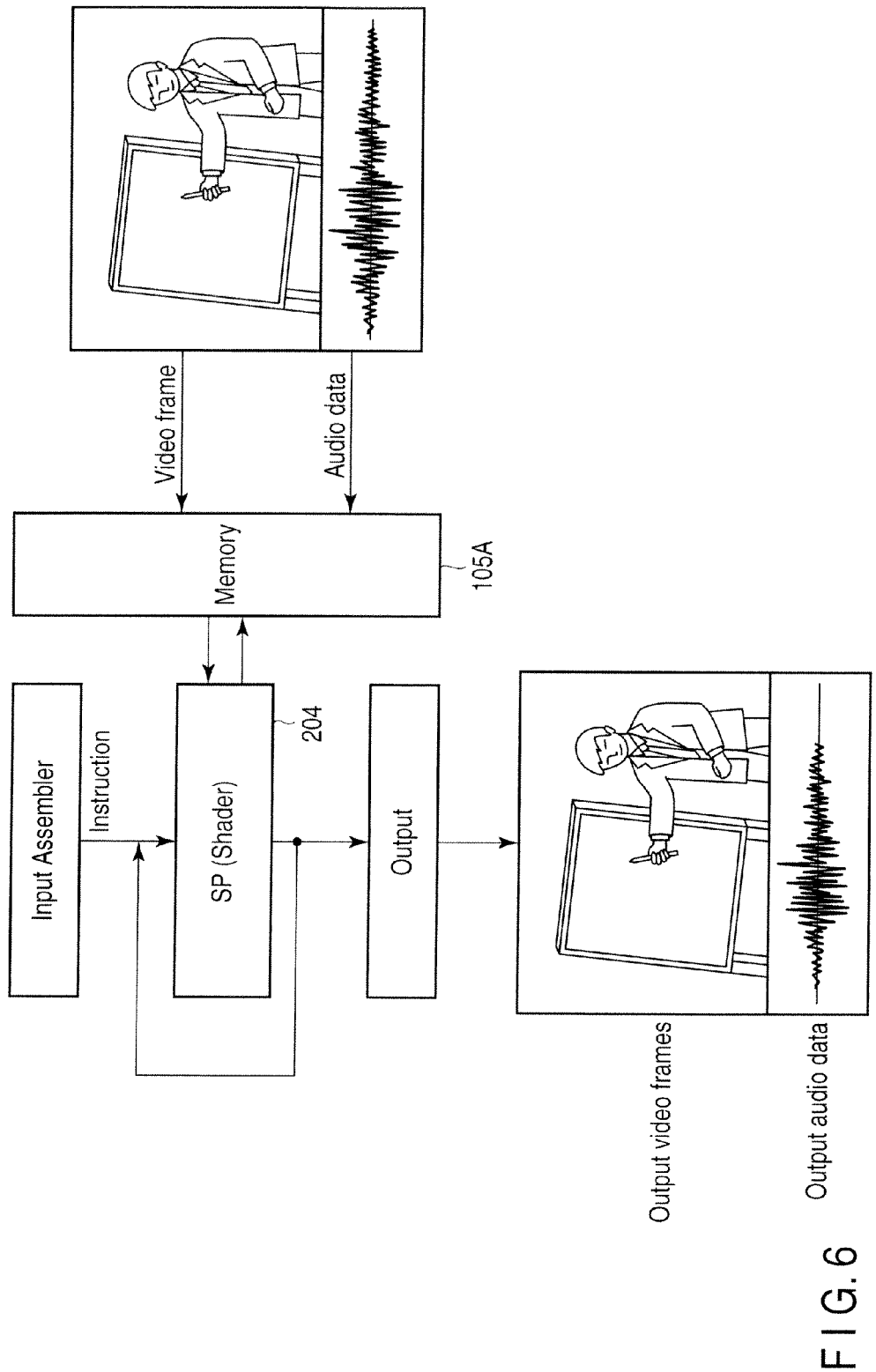
FIG. 6 is an exemplary diagram for describing the flow of a process which is executed on video data and audio data by the graphics processing unit shown in FIG. 3.

Next, referring to FIG. 6, a description is given of the flow of a process on video data and audio data, which is executed by the GPU 105. In the present embodiment, all of the following processes can be completed by the GPU 105.

(1) The GPU 105 receives video data and audio data from the host, and stores the received video data and audio data in the memory 105A. In addition, the GPU 105 may receive, from the host, streaming data in which video data and audio data are multiplexed, and may store the received streaming data in the memory 105A.

(2) The GPU 105 analyzes the video data and processes the video data in accordance with the analysis result of the video data. The analysis and processing of the video data are executed by at least one streaming processor (SP) 204 in the GPU 105. The analysis and processing of the video data by the streaming processor (SP) 204 are executed according to instructions loaded in the streaming processor (SP) 204. In parallel with the analysis and processing of the video data, the GPU 105 can analyze the audio data and process the audio data in accordance with the analysis result of the audio data. The analysis and processing of the audio data are executed by at least one other streaming processor (SP) 204 in the GPU 105. The analysis and processing of the audio data by the streaming processor (SP) 204 are executed according to instructions loaded in the streaming processor (SP) 204.

(3) In the processing of the video data, an arithmetic result of an immediately preceding video frame may be fed back for the purpose of an arithmetic operation of the present video frame. Similarly, in the processing of the audio data, an arithmetic result of an immediately preceding audio frame may be fed back for the purpose of an arithmetic operation of the present audio frame. Further, as described above, based on the analysis result of each of the video frames, the GPU 105 can process the corresponding audio frame.

(4) The GPU 105 directly outputs to the outside a video signal corresponding to the processed video data and an audio signal corresponding to the processed audio data.

Thereby, after the data is once loaded in the memory 105A of the GPU 105, the GPU 105 does not need to communicate with the CPU 101. Therefore, the CPU resources can be reduced.

Figure 7:
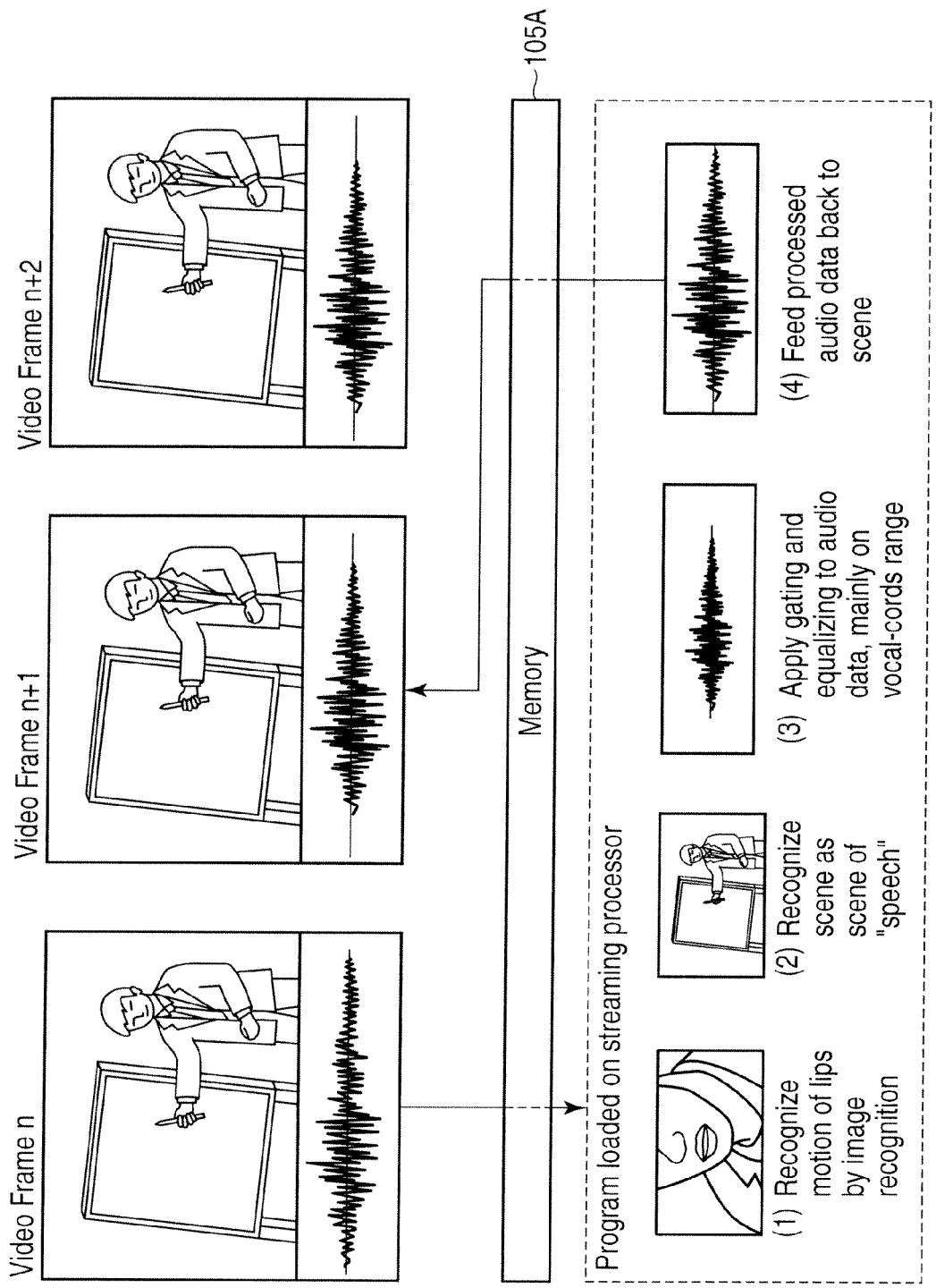
FIG. 7 is an exemplary diagram for describing an example of an audio process which is executed by the graphics processing unit shown in FIG. 3, based on an analysis result of video data.

Next, referring to FIG. 7, a description is given of an example in which an audio frame is processed based on an analysis result of a video frame. The case is now described, by way of example, in which each of frames in audio data belonging to a scene of a person who is speaking is so processed as to emphasize the voice of the person so that the voice may be easily heard.

In the streaming processor (SP) 204, instructions to execute the following processes are preloaded.

(1) An image of each frame of video data is analyzed, the lips are searched, and the motion of the lips is recognized.

(2) From the motion of the lips, a "scene in which a person is speaking" is detected (recognized).

(3) A process of gating, equalizing, etc. of a vocal-cords range of a person is executed on each of the frames of the audio data belonging to the scene in which the person is speaking, so that the vocal-cords range may be emphasized.

(4) Each of the frames of the processed audio data is fed back to the corresponding audio frame on the memory 105A.

Subsequently, some streaming processors (SP) 204 fetch video data and audio data from the memory 105A, and execute instructions which are given in advance. Thereby, at last, audio data, in which the voice-cords range of a person is emphasized in a scene of the person who is speaking, is generated by the streaming processors (SP) 204. Then, a video signal corresponding to video data and an audio signal corresponding to processed audio data are directly output to the outside.

The example of processing the audio frames based on the analysis result of the video frame is not limited to the above-described example. For example, the volume of each frame in audio data may be adjusted in accordance with the luminance of each frame in video data. In this case, the volume of audio data corresponding to a relatively dark scene may be decreased, and the volume of audio data corresponding to a relatively light scene may be increased. In addition, a reverberation process or a surround process may be applied to each audio frame belonging to a specific scene.

In the meantime, in recent years, a so-called "GPGPU" environment, in which a GPU is used for general-purpose operations, has been developed. The "GPGPU" environment is used in order to cause the GPU to execute general-purpose arithmetic operations such as scientific and technological arithmetic operations. In the "GPGPU" environment, instructions and data are sent from the CPU to the GPU, and arithmetic results obtained by the GPU are sent back to the CPU from the GPU. Thus, even if (1) audio data is input from a CPU 501 to a conventional GPU 503, as shown in FIG. 8, (2) a processing result of the audio data needs to be sent back from the GPU 503 to the CPU 501, and further (3) the processing result of the audio data needs to be transferred from the CPU 501 to a DSP 504. Consequently, many bus bands are consumed.

In the present embodiment, as shown in FIG. 9, the GPU 105 can process both video data and audio data by using the streaming processors (SP) 204, and the GPU 105 can directly output a video signal and an audio signal. Thus, simply by (1) transferring video data and audio data from the CPU 101 to the GPU 105, (2) the GPU 105 can output the video signal and audio signal. Therefore, CPU resources or bus bands may not be consumed.

Figure 10:
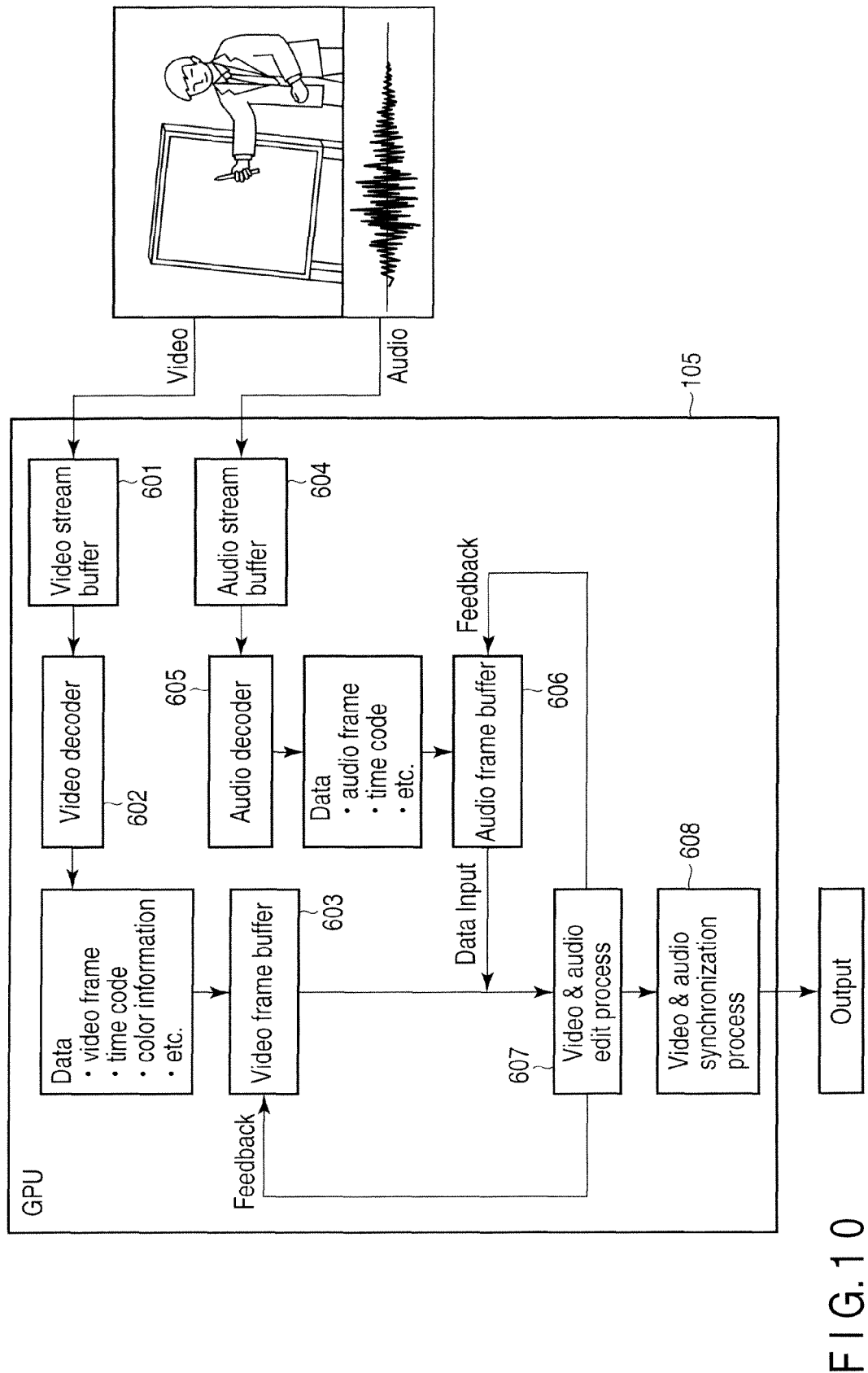
FIG. 10 is an exemplary diagram for describing the functional structure of the graphics processing unit shown in FIG. 3.

Next, referring to FIG. 10, the functional structure of the GPU 105 is described.

The GPU 105 includes a video stream buffer 601, a video decoder 602, a video frame buffer 603, an audio stream buffer 604, an audio decoder 605, an audio frame buffer 606, a video & audio edit process module 607, and a video & audio synchronization process module 608. The video stream buffer 601, video frame buffer 603, audio stream buffer 604 and audio frame buffer 606 are memory areas on the memory 105A.

The video stream buffer 601 is a buffer for storing a stream of video data which is transferred from the host. The stream of the video data may be encoded. The audio stream buffer 604 is a buffer for storing a stream of audio data which is transferred from the host. The stream of the audio data may also be encoded.

The video decoder 602 fetches video data from the video stream buffer 601, and decodes the fetched video data. By decoding the video data, frame-unit data, information accompanying each frame (e.g. color information), and a time code for synchronization are extracted. The color information is indicative of a color format (YUV, RGB) of the corresponding video frame. The video frame (image data), color information and time code, which are obtained on a frame-by-frame basis by the decoding, are stored in the video frame buffer 603. The video decoder 602 may be realized by causing, for example, at least one streaming processor (SP) 204 to execute a decoding process. In other words, the video decoder 602 may be realized by the arithmetic control unit 203A and at least one streaming processor (SP) 204 to which the task for video decoding is allocated by the arithmetic control unit 203A.

The audio decoder 605 fetches audio data from the audio stream buffer 604, and decodes the fetched audio data. By decoding the audio data, frame-unit data, information accompanying each frame and a time code for synchronization are extracted. The audio frame (data) and time code, which are obtained on a frame-by-frame basis by the decoding, are stored in the audio frame buffer 606.

The video & audio edit process module 607 executes analysis and processing of the video data on the video frame buffer 603, and also executes analysis and processing of the audio data on the audio frame buffer 606. Besides, the video & audio edit process module 607 can also process the audio data on the audio frame buffer 606, based on the analysis result of the frames of the video data on the video frame buffer 603. The video & audio edit process module 607 may be realized by the arithmetic control unit 203A, at least one streaming processor (SP) 204 to which the task for video analysis is allocated by the arithmetic control unit 203A, and at least one streaming processor (SP) 204 to which the task for audio edit is allocated by the arithmetic control unit 203A.

The video & audio edit process module 607 can also process each frame of the video data on the video frame buffer 603, based on the analysis result of each frame of the audio data on the audio frame buffer 606. The video & audio edit process module 607 may be realized by the arithmetic control unit 203A, at least one streaming processor (SP) 204 to which the task for audio analysis is allocated by the arithmetic control unit 203A, and at least one streaming processor (SP) 204 to which the task for video edit is allocated by the arithmetic control unit 203A.

The video & audio synchronization process module 608 synchronizes the video data and audio data by using the time code of each analyzed and processed video frame and the time code of each analyzed and processed audio frame. A video signal corresponding to the processed video data is output to the outside via the video signal output interface 206. At the same time, an audio signal corresponding to the processed audio data is output to the outside via the audio signal input/output interface 207.

In the above description, the example of processing the video data and audio data in a cooperative manner has mainly been described. Similarly, each frame of audio data can be processed in accordance with the analysis result of each frame of graphics data.

As has been described above, according to the present embodiment, the GPU 105 can adaptively apply various processes, which correspond to, e.g. characteristics of each scene of video data, to audio data. In addition, the GPU 105 can directly output to the outside the video signal corresponding to the video data and the audio signal corresponding to the audio data. Therefore, the audio data can be processed in cooperation with the video data.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A graphics processing unit comprising:
   a host interface configured to receive video data and audio data from a host;
   a memory controller configured to store the received video data and audio data in a memory;
   a plurality of processing cores coupled to the memory;
   an arithmetic control unit configured to detect characteristics of the video data by analyzing frames of the video data on the memory by using at least one first processing core of the plurality of processing cores, and to apply a process, which is associated with the detected characteristics of the video data, to the audio data on the memory, by using at least one second processing core of the plurality of processing cores;
   a video signal output interface configured to generate a video signal corresponding to the video data and to output the generated video signal to a display device; and
   an audio signal output interface configured to generate an audio signal corresponding to the audio data to which the process has been applied, and to output the generated audio signal to a sound device.

2. The graphics processing unit of claim 1, wherein the arithmetic control unit is configured to detect a specific scene in the video data, based on the characteristics of the video data, and to apply a predetermined process to each of frames of the audio data belonging to the specific scene.

3. The graphics processing unit of claim 1, wherein the arithmetic control unit is configured to allocate to the at least one first processing core a first task for detecting the characteristics of the video data by analyzing the frames of the video data on the memory, and to allocate to the at least one second processing core a second task for applying a process, which is associated with the detected characteristics of the video data, to the audio data on the memory.

4. The graphics processing unit of claim 1, wherein the arithmetic control unit is configured to detect characteristics of the audio data by analyzing frames of the audio data on the memory, by using at least one processing core of the plurality of processing cores, and to apply a process, which is associated with the detected characteristics of the audio data, to the video data on the memory, by using at least one processing core of the plurality of processing cores.

5. The graphics processing unit of claim 1, further comprising an audio signal input interface configured to input an audio signal from the sound device.

6. An information processing apparatus comprising:
   a central processing unit (CPU); and
   a graphics controller coupled to the CPU and configured to process graphics data, video data and audio data in accordance with a request from the CPU, wherein the graphics controller comprises:
     a host interface configured to receive video data and audio data from the CPU;
     a memory controller configured to store the received video data and audio data in a memory;
     a plurality of processing cores coupled to the memory;
     an arithmetic control unit configured to detect characteristics of the video data by analyzing frames of the video data on the memory by using at least one first processing core of the plurality of processing cores, and to apply a process, which is associated with the detected characteristics of the video data, to the audio data on the memory, by using at least one second processing core of the plurality of processing cores;
     a video signal output interface configured to generate a video signal corresponding to the video data and to output the generated video signal to a display device; and
     an audio signal output interface configured to generate an audio signal corresponding to the audio data to which the process has been applied, and to output the generated audio signal to a sound device.

7. The information processing apparatus of claim 6, wherein the arithmetic control unit is configured to detect a specific scene in the video data, based on the characteristics of the video data, and to apply a predetermined process to each of frames of the audio data belonging to the specific scene.

8. The information processing apparatus of claim 6, wherein the arithmetic control unit is configured to allocate to the at least one first processing core a first task for detecting the characteristics of the video data by analyzing the frames of the video data on the memory, and to allocate to the at least one second processing core a second task for applying a process, which is associated with the detected characteristics of the video data, to the audio data on the memory.

* * * * *